(12) United States Patent
Westman

(10) Patent No.: US 7,889,142 B1
(45) Date of Patent: Feb. 15, 2011

(54) AERODYNAMIC WINGTIP DEVICE WITH INTEGRAL GROUND PLANE

(75) Inventor: Aaron L. Westman, Rochester, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 426 days.

(21) Appl. No.: 12/199,405

(22) Filed: Aug. 27, 2008

(51) Int. Cl.
*H01Q 1/28* (2006.01)
(52) U.S. Cl. .................................. 343/705; 343/708
(58) Field of Classification Search .................. 343/705, 343/708, 787
See application file for complete search history.

(56) References Cited

U.S. PATENT DOCUMENTS

| 3,774,220 | A | 11/1973 | Martin et al. |
| 4,749,997 | A | 6/1988 | Canonico |
| 6,653,980 | B2 | 11/2003 | Ceccom et al. |
| 6,954,182 | B2 | 10/2005 | Knapp |
| 7,002,349 | B2 * | 2/2006 | Barringer ..................... 324/330 |
| 7,182,297 | B2 | 2/2007 | Jackson |
| 7,589,683 | B2 * | 9/2009 | McKivergan et al. ....... 343/708 |
| 2004/0207560 | A1 * | 10/2004 | Knapp ......................... 343/705 |

* cited by examiner

*Primary Examiner*—Tan Ho
(74) *Attorney, Agent, or Firm*—Hamre, Schumann, Mueller & Larson, P.C.

(57) ABSTRACT

An aircraft wing that includes a conductive ground plane adjacent the wingtip, where the ground plane conforms to an aerodynamic surface of the wing. Because the ground plane conforms to the aerodynamic surface, it has minimal impact on the aerodynamics of the wing. The ground plane can be part of a wingtip device that is detachably secured to the tip of a main wing portion. The ground plane described herein can be used on any aircraft wing structure that employs an antenna including, but not limited to, a wing of a UAV.

20 Claims, 5 Drawing Sheets

AERODYNAMIC WINGTIP DEVICE WITH INTEGRAL GROUND PLANE

FIELD

This disclosure relates to aircraft wings and wingtip devices for aircraft wings.

BACKGROUND

Some aircraft are provided with antennas located at or adjacent the tips of their wings. One example of such aircraft are small unmanned aerial vehicles (UAV's) where, due to radio frequency impact, antennas are often placed at the tips of the wings to minimize the radio frequency impact they have on one another. One problem with wingtip antennas is that it is difficult to provide a structural yet aerodynamically shaped antenna holder that can also provide a conductive ground plane required by certain antennas. The provision of a conductive ground plane also becomes difficult when the wings are made of non-conductive materials such as composites and/or plastics.

SUMMARY

An aircraft wing is described that employs a conductive ground plane adjacent the wingtip, where the ground plane conforms to an aerodynamic surface of the wing. Because the ground plane conforms to the aerodynamic surface, it has minimal impact on the aerodynamics of the wing. The ground plane described herein can be used on any aircraft wing structure that employs an antenna including, but not limited to, a wing of a UAV.

The ground plane can be part of a wingtip device that is connected to the main part of the wing. The wingtip device includes a body made from a non-conductive material, having a root end configured for connection to an end of a wing, a tip end, a leading edge, a trailing edge, and a curved top surface extending between the leading edge and the trailing edge. An antenna mount is provided on the curved top surface and is configured to mount an antenna to the body. A conductive ground plane is disposed on the curved top surface and conforms to the curved top surface.

In another embodiment, an aircraft wing includes a wing body having a root end, a tip end, a leading edge, a trailing edge, and a curved top surface. An antenna is mounted to the wing body adjacent the tip end. In addition, a conductive ground plane is disposed on the curved top surface adjacent the tip end and conforms to the curved top surface, and the conductive ground plane is connected to the antenna.

In still another embodiment, an aircraft wing includes a main wing portion having a root end and a tip end. A wingtip device includes a body made from a non-conductive material, where the body includes a root end connected to the tip end of the main wing portion, a tip end, a leading edge, a trailing edge, and a curved top surface extending between the leading edge and the trailing edge. An antenna mount is on the top surface of the wingtip device and is configured to mount an antenna to the wingtip device. A conductive ground plane is disposed on the curved top surface and conforms thereto. In addition, an antenna is mounted to the antenna mount and is connected to the conductive ground plane.

DRAWINGS

DETAILED DESCRIPTION

Figure 1:
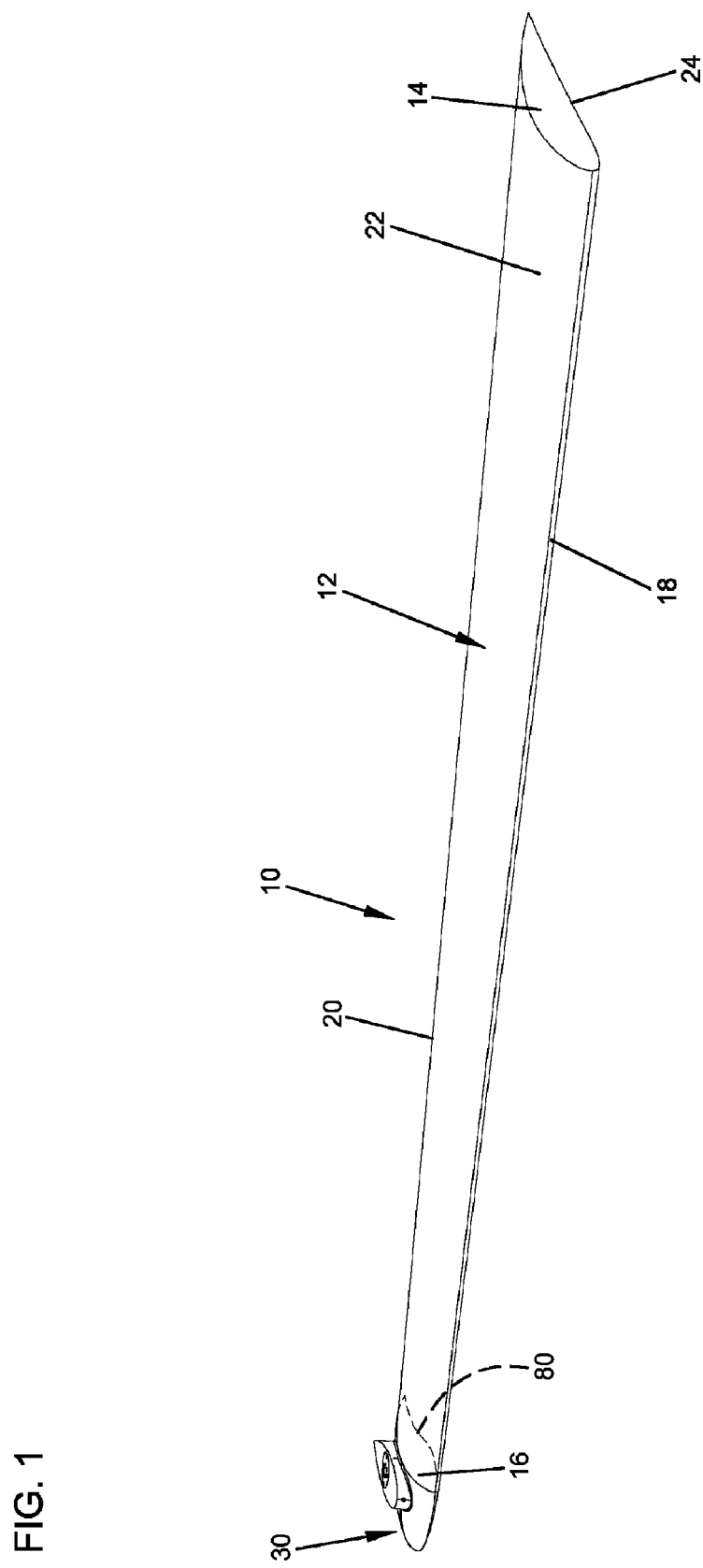
FIG. 1 is a perspective view of a wing that includes a wingtip device at the tip end thereof.

FIG. 1 illustrates an aircraft wing 10 having a main wing portion 12 with a root end 14 which in use is attached to the fuselage of the aircraft, a tip end 16, a leading edge 18, a trailing edge 20, a curved top surface 22 and a bottom surface 24. As shown in FIG. 1 at the root end 14, the main wing body 12 has an airfoil shape when viewed in cross-section. The main wing portion 12 can be constructed of a material that is suitable for the intended use of the wing 10. For example, in the case of a UAV where weight reduction is important, the main wing portion can be made of a composite material, for example a carbon fiber composite.

The wing 10 also includes a wingtip device 30 that is detachably connected to the main wing portion 12 at the tip end 16 thereof. The wingtip device 30 comprises a body made from a non-conductive material, for example a thermoplastic material such as nylon, using a suitable construction process such as Stereolithography (SLA) or Selective Laser Sintering (SLS®) rapid prototyping.

Figure 2:
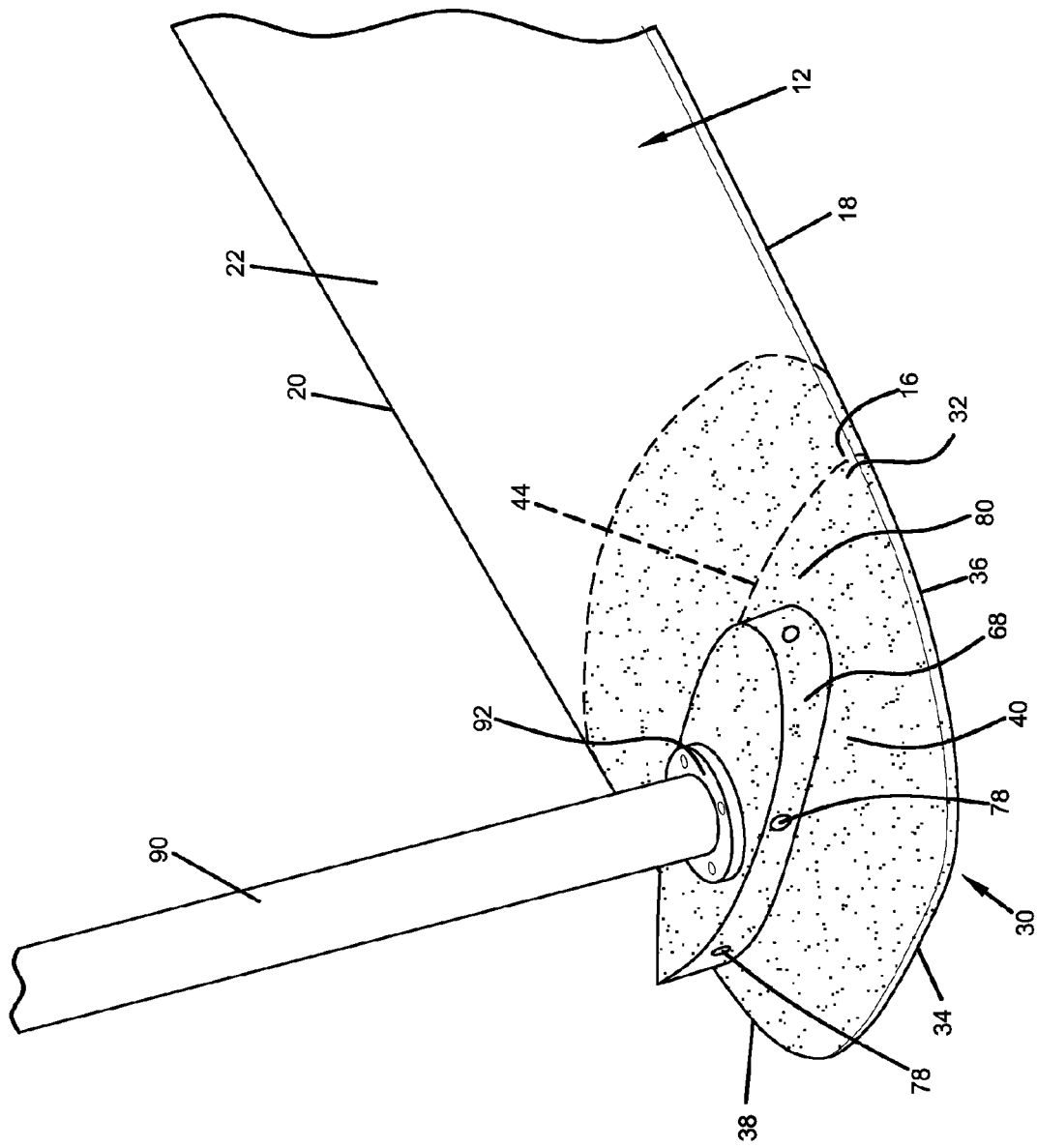
FIG. 2 is a close-up view of the wingtip device at the tip of the wing.

With reference to FIGS. 1-4, the body of the wingtip device 30 includes a root end 32 configured for connection to the tip end 16 of the main wing portion 12, a tip end 34, a leading edge 36, a trailing edge 38, a curved top surface 40 extending between the leading edge and the trailing edge, and a bottom surface 42. As shown in FIGS. 1 and 2, the leading and trailing edges 36, 38 and the top surface 40 of the wingtip device 30 are substantially continuous with, and continue the aerodynamic shape of, the leading and trailing edges 18, 20 and the top surface 22 of the main wing portion 12 to form a smooth joint at the juncture 44 of the main wing portion 12 and the wingtip device 30.

Figure 3:
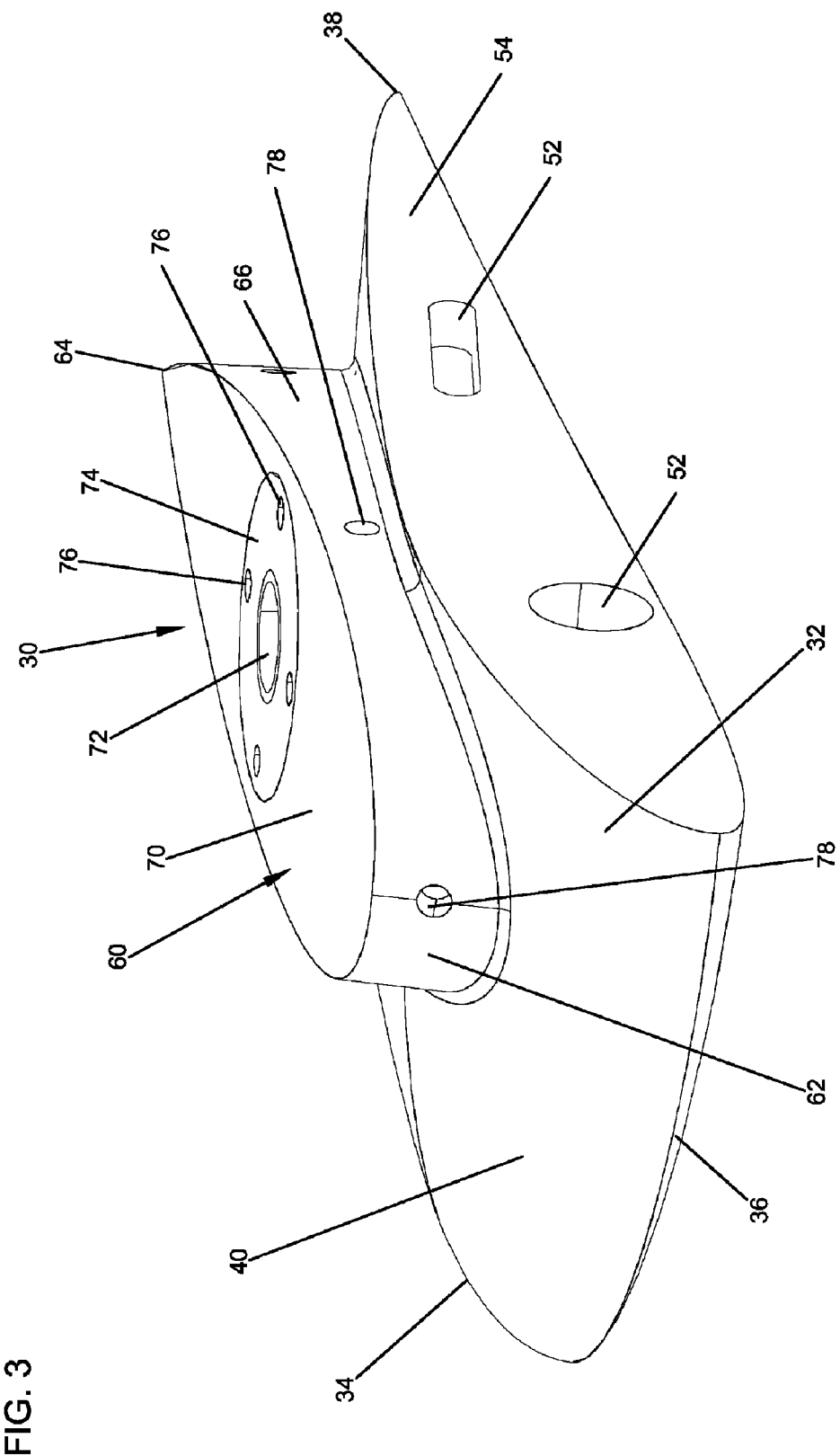
FIG. 3 is a perspective view of the wingtip device.
Figure 4:
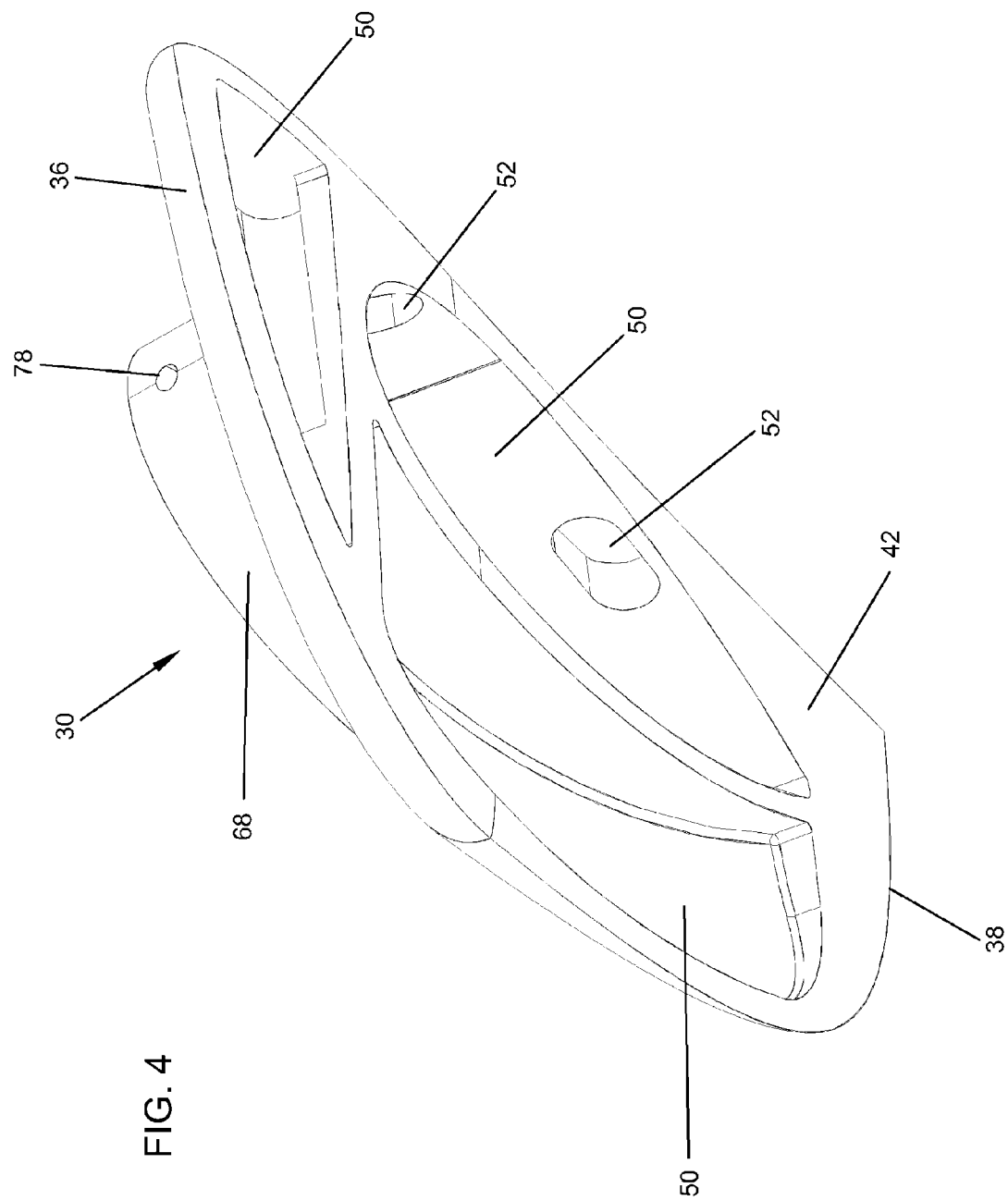
FIG. 4 is a perspective view of the wingtip device from below.

With reference to FIGS. 3 and 4, a plurality of cavities 50 extend upwardly from the bottom surface 42 toward the top surface 40. The cavities 50 help reduce the amount of material used to form the wingtip device and reduce its weight, and provide access to fastener holes 52 formed through the root end surface 54. The holes 52 are used for fasteners, such as bolts, to secure the wingtip device 30 to the tip end 16 of the main wing portion 12. The bottom of the wingtip device 30 is then finished by closing the cavities 50 using layers of shrink wrap adhesive material to provide an aerodynamic surface for the bottom that matches the bottom surface 24.

An antenna mount 60 is disposed on the wingtip device 30 for mounting an antenna. In the illustrated embodiment, the mount 60 comprises a boss that extends upwardly from the curved top surface 40. The antenna mount 60 has a generally tear-drop, airfoil shape with a leading edge 62, a trailing edge 64, side surfaces 66, 68, a top surface 70, and a chord that extends between the leading edge 62 and trailing edge 64 that is generally perpendicular to the longitudinal axis of the wing 10. A hole 72 is formed in the top surface 70 of the antenna mount 60, and a metallic washer 74 is embedded in the top surface aligned with the hole 72. Fastener holes 76 are formed in the washer 74, and fastener holes 78 are formed in the leading edge 62 and the side surfaces 66, 68.

Returning to FIGS. 1 and 2, a conductive ground plane 80 is provided that in use is electrically connected to an antenna that is mounted to the mount 60. The area of the ground plane

80 is indicated by the stippling in FIGS. 1 and 2. In the illustrated embodiment, the ground plane 80 is generally circular or oval shaped, and extends over the top surface 40 of the wingtip device 30 and over the top surface 22 of the main wing portion 12. However, it is to be realized that the ground plane could extend only over the top surface of the wingtip device 30. The ground plane 80 also extends over the antenna mount 60 which provides the electrical connection to an antenna that is mounted on the mount 60. However, the ground plane need not extend over the antenna mount. Instead, electrical connection between the antenna and the ground plane can be achieved in other ways, for example through electrical wires extending between the antenna and the ground plane.

The ground plane 80 is formed by a suitable conductive material that allows the ground plane to conform to the top surfaces 22, 40 and to the shape of antenna mount 60. As a result, the ground plane 80 has little impact on the aerodynamics of the wing 10. For example, the ground plane 80 can be formed by applying conductive metallized tape or conductive metallized paint to the appropriate surfaces. In one embodiment, the ground plane 80 can be the outermost surface of the wing so that it is exposed to airflow and environmental conditions. In another embodiment, the ground plane can be covered by one or more protective layers, for example the shrink wrap adhesive material used to cover the bottom surface.

Preferably, the ground plane 80 is applied after the wingtip device 30 is fastened to the main wing portion 12. However, the respective portions of the ground plane connected to the wingtip device and to the main wing portion could be applied before the wingtip device is fastened to the main wing portion if one determines that the resulting ground plane performs adequately.

Figure 5:
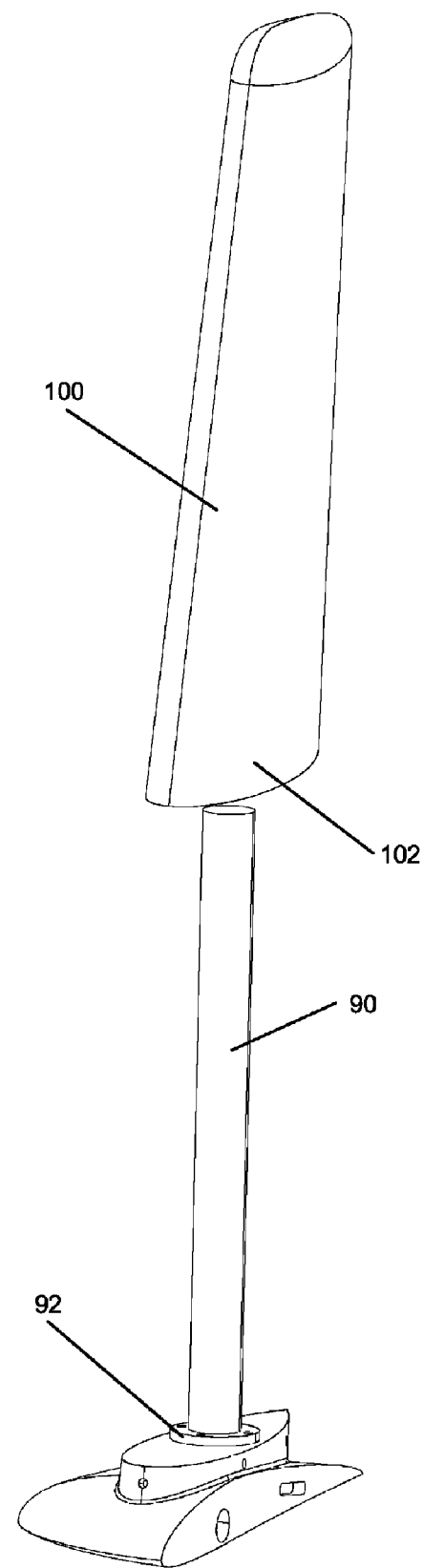
FIG. 5 illustrates the wingtip device with an antenna mounted thereto and an aerodynamic cover for the antenna.

As shown in FIGS. 2 and 5, a conventional antenna 90 is detachably mounted to the antenna mount 60 and is electrically connected to the conductive ground plane 80. Any form of antenna that is suitable for radio frequency communications can be used. In the illustrated embodiment, the antenna 90 is a cylindrical rod that projects vertically upward from the wing 10. The antenna 90 has a metal flange 92 near the base thereof that is used to detachably secure the antenna to the metallic washer 74 of the antenna mount 60, with a base end of the antenna extending slightly into the hole 72. At the same time, the metal flange 92 is in contact with the ground plane on the top surface 70 by which the antenna is electrically connected to the ground plane. The washer 74 permits mounting of many different sizes and shapes of antennas on the wing 10 by removing the antenna 90 and replacing it with a different antenna that is mounted to the mount 60.

As shown in FIG. 5, an aerodynamic cover 100 is provided for disposition over the antenna 90. The cover 100 comprises an airfoil-shaped sleeve of suitable non-conductive material, for example Kevlar®, that fits over the antenna. A base end 102 of the cover matches the shape of the antenna mount 60 and fits over the mount. The cover 100 is then secured to the mount 60 via suitable fasteners extending through the cover and into the fastener holes 78.

As evident from the above description, the aircraft wing includes a conductive ground plane adjacent the wingtip, where the ground plane conforms to an aerodynamic surface of the wing. Because the ground plane conforms to the aerodynamic surface, it has minimal impact on the aerodynamics of the wing. The ground plane described herein can be used on any aircraft wing structure that employs an antenna including, but not limited to, a wing of a UAV.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A wingtip device, comprising:
   a body made from a non-conductive material, the body including a root end configured for connection to an end of a wing, a tip end, a leading edge, a trailing edge, and a curved top surface extending between the leading edge and the trailing edge;
   an antenna mount on the curved top surface configured to detachably mount an antenna to the body; and
   a conductive ground plane disposed on the curved top surface and conforming to the curved top surface.

2. The wingtip device of claim 1, wherein the antenna mount comprises a boss projecting upward from the top surface, the boss having an airfoil shape.

3. The wingtip device of claim 2, wherein the conductive ground plane is disposed on the boss.

4. The wingtip device of claim 1, wherein the body includes a bottom surface, and at least one cavity adjacent the root end that extends upwardly from the bottom surface toward the top surface.

5. The wingtip device of claim 1, comprising an antenna mounted to the antenna mount and connected to the conductive ground plane, and further comprising an aerodynamic cover disposed over the antenna.

6. The wingtip device of claim 1, wherein the conductive ground plane comprises metallized tape or metallized paint.

7. An aircraft wing, comprising:
   a wing body having a root end, a tip end, a leading edge, a trailing edge, and a curved top surface;
   an antenna detachably mounted to the wing body adjacent the tip end; and
   a conductive ground plane disposed on the curved top surface adjacent the tip end and conforming to the curved top surface, the conductive ground plane being connected to the antenna.

8. The aircraft wing of claim 7, wherein the wing body comprises a main wing portion and a wingtip device detachably connected to the main wing portion.

9. The aircraft wing of claim 8, wherein the ground plane is disposed over the wingtip device and over the main wing portion.

10. The aircraft wing of claim 8, wherein the wingtip device is made from a non-conductive material.

11. The aircraft wing of claim 7, wherein the conductive ground plane comprises metallized tape or metallized paint.

12. The aircraft wing of claim 7, wherein the antenna is detachably mounted to the wing body via an antenna mount, and the conductive ground plane is disposed on the antenna mount.

13. The aircraft wing of claim 7, further comprising an aerodynamic cover disposed over the antenna.

14. An aircraft wing, comprising:
   a main wing portion having a root end and a tip end;
   a wingtip device including a body made from a non-conductive material, the body including a root end connected to the tip end of the main wing portion, a tip end, a leading edge, a trailing edge, and a curved top surface extending between the leading edge and the trailing edge;

an antenna mount on the top surface of the wingtip device configured to detachably mount an antenna to the wingtip device;
a conductive ground plane disposed on the curved top surface and conforming thereto; and
an antenna detachably mounted to the antenna mount and connected to the conductive ground plane.

15. The aircraft wing of claim 14, wherein the main wing portion includes a curved top surface, and the conductive ground plane is disposed on the curved top surface of the main wing portion and conforms to the curved top surface of the main wing portion.

16. The aircraft wing of claim 14, wherein the antenna projects upwardly from the antenna mount, and further comprising an aerodynamic cover disposed over the antenna.

17. The aircraft wing of claim 14, wherein the antenna mount comprises a boss projecting upward from the top surface, the boss having an airfoil shape, and the conductive ground plane is also disposed on the boss.

18. The aircraft wing of claim 14, wherein the body includes a bottom surface, and at least one cavity adjacent the root end of the body that extends upwardly from the bottom surface toward the top surface.

19. The aircraft wing of claim 14, wherein the conductive ground plane comprises metallized tape or metallized paint.

20. The aircraft wing of claim 14, wherein the antenna mount is designed to permit detachable mounting of different sizes and shapes of antennas.

* * * * *